United States Patent [19]

McKenzie

[11] Patent Number: 4,842,016

[45] Date of Patent: Jun. 27, 1989

[54] SWITCHING VALVE

[75] Inventor: Donald G. McKenzie, Calgary, Canada

[73] Assignee: Delta Projects Inc., Calgary, Canada

[21] Appl. No.: 158,528

[22] Filed: Feb. 22, 1988

[51] Int. Cl.⁴ .................. F16K 11/044; F16K 11/048
[52] U.S. Cl. ................................ 137/597; 137/625.18; 251/85
[58] Field of Search .................. 137/625.43, 309, 597, 137/310, 625.18; 251/85; 62/324.1, 324.6

[56] References Cited

U.S. PATENT DOCUMENTS

| | | | |
|---|---|---|---|
| 2,366,127 | 12/1944 | Rappl | 137/625.43 X |
| 2,639,884 | 5/1953 | Mitchell | 251/85 |
| 2,737,970 | 3/1956 | Hasche et al. | 137/309 |
| 3,078,873 | 2/1963 | Stockett | 137/625.43 X |
| 3,203,441 | 8/1965 | Kervin | 137/309 |
| 4,644,760 | 2/1987 | Aoki et al. | 62/324.6 |

FOREIGN PATENT DOCUMENTS 868849 5/1961 United Kingdom .......... 137/625.43

Primary Examiner—Stephen Hepperle
Attorney, Agent, or Firm—Rogers, Bereskin & Parr

[57] ABSTRACT

A two position four-way switching valve has two inputs and two outputs. In one position of the valve, each input is connected to a defined one of the outputs, while in a second position the outputs are reversed. In a specific embodiment, the valve includes an inner cylindrical member enclosed within an outer casing having an opening forming an outlet. The other outlet and the two inlets are formed by tubes that extend inwardly through the casing and communicate with ports in the inner cylindrical member. The ports include first, second and third ports are spaced axially along the cylindrical member. Fluid entering through the inlets is routed to the outlets by plug-type valves including seals carried by an axially movable stem extending through the cylindrical member.

7 Claims, 2 Drawing Sheets

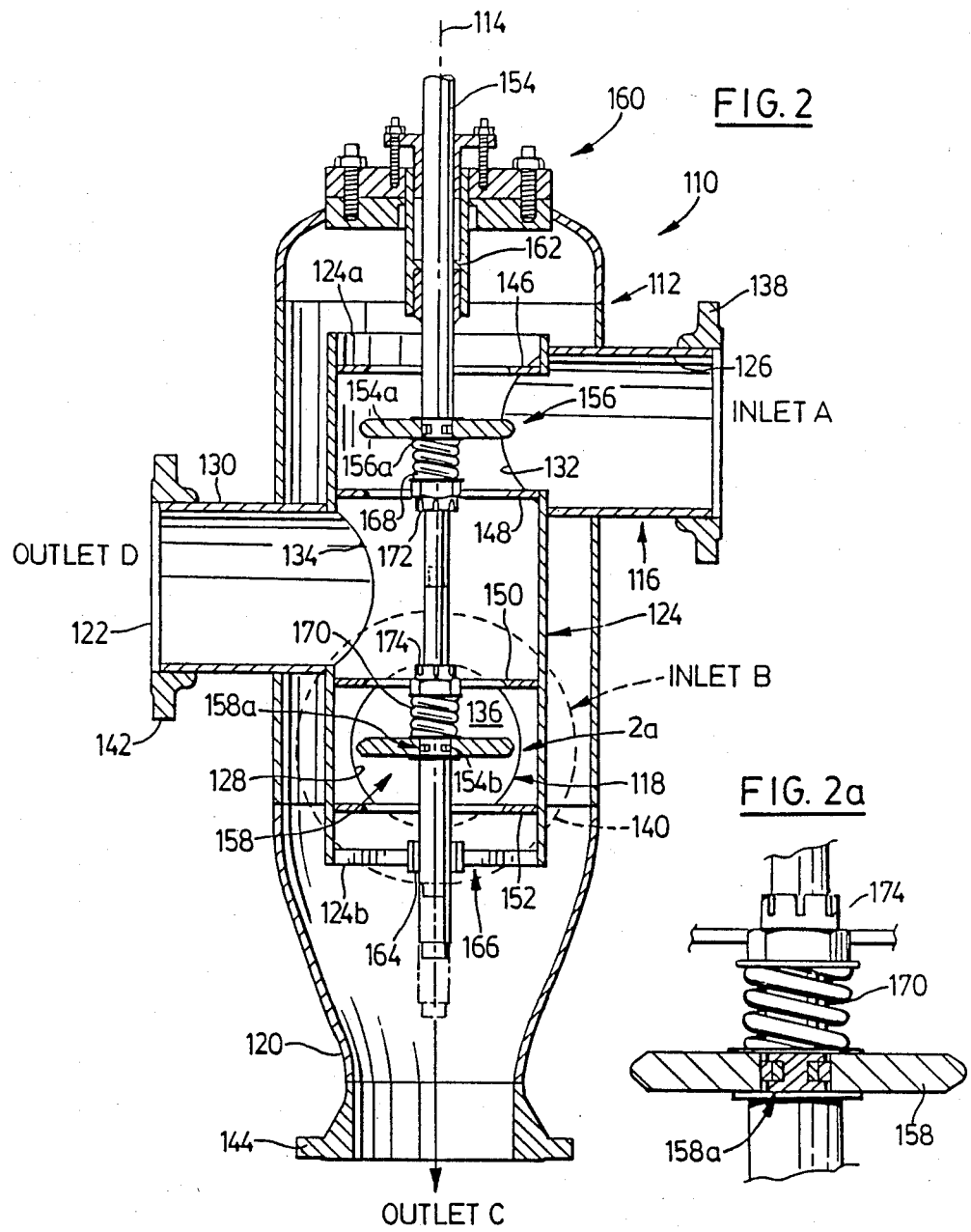

SWITCHING VALVE

FIELD OF THE INVENTION

This invention relates generally to switching valves for fluid streams.

SUMMARY OF THE INVENTION

An object of the invention is to provide a switching valve that has two inlets and two outlets, and in which the valve is switchable between a first position in which each inlet is connected to defined one of the outlets, and a second position in which the outlets are reversed.

The invention provides a four-way switching valve having a hollow member defining an internal chamber with opposite ends and first, second and third ports in a wall of the member and spaced along a defined axis. A valve stem is disposed on said axis and is supported for movement along said axis. In association with each of the first and third ports is a valve seal carried by the stem and disposed between a pair of valve seats within the hollow member. The seats in each pair are disposed on opposite sides of the associated port and are co-operable with the valve member for preventing fluid flow along the member. The valves seals and seats are arranged so that, in a first axial position of the valve stem, the two seals co-operate with the valve seats in the respective pairs closest to one end of the hollow member, and in a second axial position of the valve stem, the seals co-operate with the valve seats in the respective pairs closest to the opposite end of the hollow member. The valve seals are designed to form plugs for sealing with the seats, and each seal comprises a seal disc slidably mounted on the valve stem. The seal discs are spring biassed outwardly against respective shoulders on the stem so as to permit sealing to be achieved while accommodating dimensional variations due to thermal changes. A piston ring-type seal is provided between each valve disc and the valve stem.

The valve provided by the invention has in effect four ports, namely the first, second and third ports referred to previously and a fourth port defined by one of the two ends of the hollow member depending on the axial position of the valve stem. In one position of the stem, the first port will communicate with the second port and the third port will communicate with one end of the hollow member, forming the fourth port. In the other position of the valve stem, the second and third ports will communicate with one another and the first port will communicate with the opposite end of the member.

Preferably, the hollow member referred to previously will be an inner hollow member and will be enclosed within an outer hollow member that will in effect couple the two ends of the inner member. The outer member will then have an opening in its wall forming the fourth port of the valve.

BRIEF DESCRIPTION OF THE DRAWINGS

In order that the invention may be more clearly understood, reference will now be made to the accompanying drawings which illustrate a preferred embodiment of the invention by way of example, and in which:

FIG. 2 is a longitudinal sectional view through the valve; and,

FIG. 2a is an enlarged detail of the part of FIG. 2 denoted '2a'''. de

DESCRIPTION OF THE PREFERRED EMBODIMENT

Figure 1:
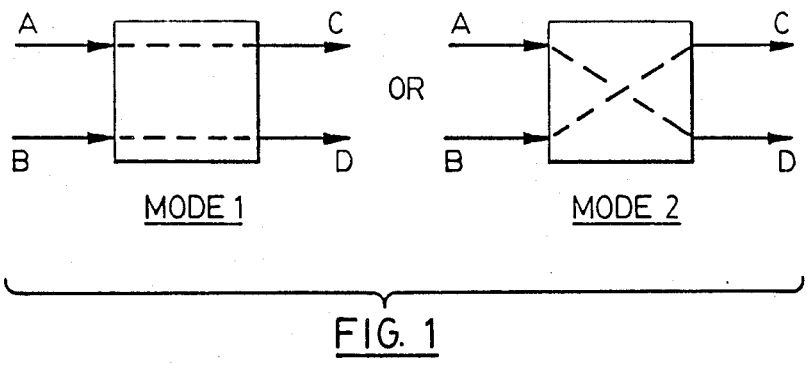
FIG. 1 comprises diagrammatic illustrations of two positions of the valve provided by the invention.

Referring first to FIG. 1, each valve has two inlets and two outlets, the two inlets being denoted A and B and the two outlets C and D. The valve provides two mutually isolated flow plaths through the valve from the inlets to the outlets. Each valve is switchable between the first position indicated as "Mode 1" in which each inlet is coupled to a defined outlet and a second position denoted "Mode 2", in which the outlets are reversed. In "Mode 1", inlet A is coupled to outlet C and inlet B is coupled to outlet D. In "Mode 2", the outlets have been reversed so that inlet A is connected to outlet D and inlet B is connected to outlet C.

In FIG. 2, the valve is generally indicated by reference numeral 110 and has a generally cylindrical casing 112 that extends about an axis 114. The valve has two inlets 116 and 118 denoted respectively as "inlet A" and "inlet B" and two outlets 120 and 122 denoted as "outlet C" and "outlet D". As discussed previously, the valve can adopt either of two positions referred to as "mode 1" and "mode 2". In mode 1 inlet A is connected to outlet C and inlet B is connected to outlet D, while in mode 2 the outlets are reversed. As drawn, the valve is in an intermediate, transitional position between the positions of mode 1 and mode 2.

Disposed concentrically within casing 112 and extending about axis 114 is an inner hollow member 124 of cylindrical shape. Member 124 defines an internal chamber having open opposite ends 124a and 124b. The inlets 116 and 118 and outlet 122 are formed by respective tubular members 126, 128 and 130 that extend inwardly through the outer casing 112 and are joined to the inner cylindrical member at openings in its wall forming first, second and third ports (denoted respectively 132, 134 and 136) spaced along axis 114.

At their outer ends, the tubular members have respective flanges 138, 140 and 142 for connection to external pipework. Casing 112 is open at its lower end and forms outlet 120. In this particular embodiment, the lower end portion of the casing is flared inwardly because the opening from outlet 120 is required to be narrower than the diameter of the casing and similar in size to that of the tubular members 126, 128 and 130 (although this is not of course essential). This inward flaring is one means by which the overall flow characteristics of the preferred embodiment can be improved. A connection flange 144 is provided for outlet 120.

Four valve seats are provided inside cylindrical member 124 and are arranged in pairs respectively above and below each of the first and third ports 132 and 136. The upper pair of valve seats above and below port 132 are denoted respectively as 146 and 148 while the corresponding valve seats for port 136 are denoted 150 and 152.

Disposed on axis 114 and extending inwardly through the upper end of casing 112 and through the cylindrical member 124 is a valve stem 154 that carries two disc-shaped valve seals 156 and 158 disposed respectively between the two pairs of valve seats 146, 148 and 150, 152.

A conventional packing gland generally denoted 160 is provided at the top of the casing around the valve stem 154. This packed gland can be equipped with jacketing complete with heating coil as well as graphite lubricant through a latern ring in the packing if required in service. The gland is also equipped with a cast-iron scraper bushing 162 which acts as a stem guide and also as a scraper for removing deposits on the stem which would deteriorate the packing in service. The lower end portion of the valve stem 154 is guided by a cast-iron bushing 164 supported at the lower end of the cylindrical member 124 by a spider denoted 166.

The two valve seals 156, 158 are biassed outwardly against shoulders 154a,154b on stem 154 by respective springs 168, 170. The springs in turn react against respective nuts 172 and 174 that are screw-threaded onto stem 154. This arrangement allows 'thermal growth' permitting the valve discs to seal even when the valve stem elongates dissimilarly to the cylindrical casing 112 and inner hollow member 124 when dissimilar metalurgy is incorporated.

Fluid leakage through the seals 156, 158 where the valve stem passes through is prevented with the use of metal-to-metal piston ring type seals generally indicated at 156a, 158a. As best seen in FIG. 2a, two rings are preferably employed at each location and are positioned one inside the other with the ring splits located 180° apart. This configuration greatly reduces the amount of leakage due to the labyrinth sealing effect.

The valve seals and seats are of what might be termed "plug-line" contact crushing type. In other words, the seals in effect plug the seats to form a closure. At the same time, the seals have slightly convex surfaces where they contact the seats so that in fact line contact is established, as opposed to face-to-face surface contact. The seals have the effect of crushing any particles that might accumulate on the seats. In alternative embodiments, the valves could be designed with a variety of seating arrangements (e.g. knife-edge type seats or shearing-type seats).

Stroking of the valve stem 154 can be accomplished manually or by suitable power actuator means (e.g. pneumatic). Upward vertical movement of the valve stem from the position shown will bring the two valve discs into contact with the upper valve seats 146 and 150 respectively. Fluid entering inlet A will then flow into the interior of the cylindrical member 124 and out through outlet D. At the same time, the fluid entering inlet B will flow downwardly and out of the lower end of cylindrical member 124 and through outlet C. Downward vertical movement of the valve stem 154 to bring the valve discs into contact with the seats 148 and 152 will in effect reverse the outlets. Fluid entering through inlet A will then flow upwardly through valve seat 146 and into the space between the exterior of the cylindrical member 124 and the casing. The fluid will then flow downwardly in the space and out of outlet C. The fluid entering through inlet B will flow upwardly in the cylindrical member and out of outlet D.

It should be noted that the valve will also operate in the reverse direction; that is, conduits 120 and 130 can act as inlets and the other two conduits as outlets.

The valve can be used for switching liquid and/or gas streams. An example of an application of the valve is in the switching of gas streams in a sulphur recovery plant for example of the form disclosed in a co-pending patent application of even date herwith entitled "Apparatus for Recovering Elemental Sulphur" naming David W. McDougall as inventor. Another example of a possible application of a valve of this type is in a primary/polishing water softening process.

It will of course be understood that the preceding description relates to a particular preferred embodiment of the invention and that modifications are possible within the broad scope of the invention. Some possible modifications have been indicated previously and others will be apparent to a person skilled in the art.

A specific modification that may be appropriate in some applications is that the outer casing 112 could be omitted, in which case fluid would discharge from the relevant end of the inner cylindrical member 124 depending upon the axial position of the valve stem 154. If required, those ends could be piped together to a single inlet/outlet orifice.

I claim:

1. A four-way switching valve comprising:
   a hollow member defining an internal chamber having open opposite ends;
   first, second and third ports in a wall of said member, said ports being spaced along a defined axis;
   a valve stem disposed on said axis and supported for movement along said axis;
   in association with each of said first and third ports, a valve seal carried by said stem and disposed between a pair of valve seats within said hollow member, the seats in each pair being disposed on opposite sides of the associated port and being co-operable with the valve member for preventing fluid flow along said member, the valve seals and seats being arranged so that, in a first axial position of said valve stem, the two seals co-operate with the valve seats in the respective pairs closest to a first said end of the hollow member, and in a second axial position of the valve stem, said seals co-operate with the valve seats in the respective pairs closest to the opposite said end of the hollow member;
   wherein said valve seals are designed to form plugs for sealing with said seats, each seal comprising a seal disc slidably mounted on said valve stem, the seal discs being spring biased outwardly against respective shoulders on said stem so as to permit sealing to be achieved while accommodating dimensional variations due to thermal changes; and,
   a piston ring-type seal between each said valve disc and the valve stem.

2. A four-way switching valve comprising:
   a hollow member defining an internal chamber having open opposite ends;
   first, second and third ports in a wall of said member, said ports being spaced along a defined axis;
   a valve stem disposed on said axis and supported for movement along said axis; and,
   in association with each of said first and third ports, a valve seal carried by said stem and disposed between a pair of valve seats within said hollow member, the seats in each pair being disposed on opposite sides of the associated port and being co-operable with the valve member for preventing fluid flow along said member, the valve seals and seats being arranged so that, in a first axial position of said valve stem the two seals co-operate with the valve seats in the respective pairs closest to a first said end of the hollow member, and in a second axial position of the valve stem, said seals co-operate with the valve seats in the respective pairs closest to the opposite said end of the hollow member;
   wherein said hollow member is an inner member and wherein the valve further comprises an outer hollow member enclosing said inner member and defining a second internal chamber including an opening defining a fourth port, and respective conduits extending through said outer hollow member and communicating with said first, second and third ports for permitting fluid flow between said ports and external connections to said valve, said inner hollow member being of cylindrical shape and said outer hollow member including a cylindrical portion concentric with said inner hollow member, said inner hollow member having a longitudinal axis forming said defined axis along which said first, second and third ports are spaced, said conduits comprising respective cylinders extending inwardly through said outer hollow member for communication with said ports.

3. A valve as claimed in claim 1, wherein said hollow member is an inner member and wherein the valve further comprises an outer hollow member enclosing said inner member and defining a second internal chamber including an opening defining a fourth port, and respective conduits extending through said outer hollow member and communicating with said first, second and third ports for permitting fluid flow between said ports and external connections to said valve.

4. A valve as claimed in claim 2, wherein said valve seals are designed to form plugs for sealing with said seats, each seal comprising a seal disc slidably mounted on said valve stem, the seal discs being spring biassed outwardly against respective shoulders on said stem so as to permit sealing to be achieved while accomodating dimensional variations due to thermal changes.

5. A valve as claimed in claim 4, further comprising a piston ring-type seal between each said valve disc and the valve stem.

6. A valve as claimed in claim 3, wherein said inner hollow member is of cylindrical shape and wherein said outer hollow member includes a cylindrical portion concentric with said inner hollow member, said inner cylinder having a longitudinal axis forming said defined axis along which said first, second and third ports are spaced, said conduits comprising respective cylinders extending inwardly through said outer hollow member for communication with said ports.

7. A valve as claimed in claim 2, wherein said valve stem projects from one end of said inner hollow member, through said outer hollow member for permitting actuation of the valve from externally thereof, and wherein the outer hollow member is provided with a conventional packing gland receiving said projecting portion of the valve stem, the valve further including a spider supporting the valve stem adjacent the opposite end of said inner hollow member.

* * * * *